UNITED STATES PATENT OFFICE.

JNO. HEMMING AND H. G. DYAR, COUNTY OF MIDDLESEX, ENGLAND.

IMPROVEMENT IN THE MODE OF MANUFACTURING CARBONATE OF SODA.

Specification forming part of Letters Patent No. 1,191, dated June 24, 1839.

*To all whom it may concern:*

Be it known that we, HARRISON GREY DYAR, of Cavendish Square, and JOHN HEMMING, of Edward Street, Cavendish Square, both in the county of Middlesex, in the Kingdom of Great Britain—JOHN HEMMING a subject of the Queen of Great Britain and HARRISON GREY DYAR a citizen of the United States of America—have invented or discovered new and useful Improvements in the Manufacture of Carbonate of Soda; and we, the said HARRISON GREY DYAR and JOHN HEMMING, do hereby declare that the nature of our said invention and the manner in which the same is to be performed are described and ascertained in manner following—that is to say:

The nature of our invention consists in the use of carbonate of ammonia—that is, the sesqui-carbonate or bicarbonate—in the manufacture of carbonate of soda by applying it to decompose common salt, and also in afterward restoring or recovering the ammonia which has been so used, or the greater part thereof, in such a way as to allow of its being used again to convert other portions of common salt into carbonate of soda, thus repeatedly producing successive portions of carbonate of soda from the same portion of ammonia.

To render the description of our process more intelligible, we divide it into two parts, the first part being the description of our method of using the sesqui-carbonate or bicarbonate of ammonia in the manufacture of carbonate of soda, the second part being the description of our method of restoring or recovering the ammonia, or the greater part thereof, in such a way as to be again employed in converting other portions of common salt into carbonate of soda.

As to the first part, the carbonate of ammonia of commerce is what chemists call the "sesqui-carbonate," and in describing our process we shall use the term "carbonate of ammonia" as denoting the sesqui-carbonate. The bicarbonate is not generally met with, but is to be preferred when it can be obtained, and accordingly in reproducing the ammonia we recommend the process to be carried on in such manner as to produce as much of the bicarbonate as possible. We take nearly equal quantities, by weight, of common salt, otherwise called "chloride of sodium," or muriate of soda and of carbonate of ammonia. We dissolve the common salt in as much water as is barely sufficient to dissolve it, so as to constitute a fully-saturated solution, and when so dissolved we add to it the carbonate of ammonia in the solid form, but bruised or pounded to a state of fine powder. We prefer that the common salt should be the substance dissolved, and to add to it the said carbonate of ammonia in a pulverized state; but the result may be obtained by dissolving the ammonia and adding the common salt in a state of powder; but according to our experience this is not quite so well. We mix them well together and suffer them to remain thus mixed from ten to twenty hours, stirring or agitating them from time to time to prevent the solid parts from settling before the chemical action is sufficiently complete. We then drain or filter the liquid from the solid matter, and in order to separate as perfectly as is convenient all the liquid from the solid matter we press the substance in an ordinary hydraulic or screw press, or submit it to considerable pressure by any other convenient mode. The solid matter thus obtained is chiefly a carbonate of soda containing, however, more carbonic acid than is found in soda-ash or crystals of carbonate of soda of commerce. To remove this excess of carbonic acid and to recover any ammonia contained in the carbonate of soda, we next place the solid matter so obtained as aforesaid in a retort or other convenient vessel and heat it to from about 600° to 800° of Fahrenheit until all the liquid and volatile matter contained in it is drawn off by that heat. The substance left in the retort is carbonate of soda. We pass the matter thus volatilized into a cool chamber or refrigerating apparatus—an example of which is furnished by the lead balloons used in the condensation of carbonate of ammonia in the usual manner—wherein the carbonate of ammonia becomes condensed; but any convenient mode of condensing ammonia may be adopted.

As to the second part, the liquid separated from the solid matter—that is to say, from the solid carbonate of soda by the pressure in the operations described in the first part of this specification, or by filtration—contains in solution muriate and carbonate of ammonia, common salt, and probably also a small portion of the carbonate of soda formed. In order, therefore, to separate the carbonate of ammonia therefrom, we place it in a distilling-vessel and distil over the water and the carbonate of ammonia and receive the product into a cask or proper vessel, which we keep filled with carbonic acid obtained from any economic source, in order to prevent loss of ammonia; or, instead of distilling over, as above described, the water and the carbonate of ammonia, we add to the liquid a solution of muriate of lime or chloride of calcium, which is one of the results of our process, until a precipitate, which is chiefly carbonate of lime, ceases to fall. We separate this precipitated carbonate of lime by filtration or other means from the liquid, which is then chiefly a solution of muriate of ammonia and common salt. We evaporate this by heat to a sufficient consistency to enable us to separate the common salt in cases where it is desirable to do so on account of the value of common salt, which, being less soluble in hot or boiling water than muriate of ammonia, crystallizes first and may be separated by well-known means. When the common salt is removed from the liquor, if desirable, or without that process if not thought worth while, we evaporate by gentle heat the muriate of ammonia to dryness and mix it intimately with a sufficient quantity of pounded chalk, and heat the mixture in an iron retort or other proper vessel until the carbonate of ammonia formed by this operation is sublimed and separated in the usual way. We receive this carbonate of ammonia in a chamber or vessel formed of lead or other suitable material, where it becomes condensed, and we make a communication by means of a pipe between this chamber or vessel and another chamber or chambers. Into one or more of these chambers we cause the carbonic acid and other volatile matters to pass which were expelled by heat from the carbonate of soda, formed as before described in the first part of this specification. We receive the carbonic acid into one or more of these chambers for the purpose of preventing loss of ammonia by converting free ammonia into carbonate of ammonia or bicarbonate of ammonia, and if the carbonic acid from the soda is not sufficient for this end we pass more into them, which we obtain from coal, coke, charcoal, or any other economic source, as well as a sufficient quantity of water or vapor of water to condense and save the ammonia; or, in order effectually to prevent the loss of ammonia, we pass into the last of the vessels or chambers we employ to receive and condense the carbonate of ammonia a sufficient quantity of muriatic-acid gas obtained by adding sulphuric acid to common salt or from any other economic source. The muriatic-acid gas combining readily with free ammonia, or the carbonate of ammonia in vapor, forms muriate of ammonia, and thus precipitates in the chamber, by which operation we avoid any loss of ammonia that might otherwise ensue. The muriate of ammonia thus obtained we treat in the same manner as the muriate of ammonia separated from the liquids before described, so that this muriate of ammonia may be converted into carbonate of ammonia or bicarbonate. The carbonate of ammonia obtained or reproduced or recovered from distilling the muriate of ammonia with chalk, as hereinbefore described, as well as that obtained by the distillation of the liquid, as also hereinbefore described, or by any of the other modes hereinbefore described, we employ over again to convert other portions of common salt into carbonate of soda, according to the plan detailed in the first part of this specification. The common salt separated from the muriate of ammonia, as before described, we again employ with other portions of common salt in subsequent operations. The residue found in the retorts after the sublimation of the carbonate of ammonia is chiefly muriate of lime or chloride of calcium, which may be used as before mentioned.

In all the operations we have described for the manufacture of carbonate of soda we employ vessels or apparatus of such construction as to expose the carbonate of ammonia employed as little as possible to the air, so that loss of ammonia may be prevented.

We do not claim as our invention any particular form of vessels or apparatus in which our operations are conducted, nor any of the chemical substances above mentioned, merely as such; but

We claim as our invention or improvements—

The use of carbonate or bicarbonate of ammonia in converting common salt into a carbonate of soda, as hereinbefore described, and as this mode would be too expensive to be profitable if we could not recover the ammonia used for this purpose, so as to make it available for repeated operations, we claim, in combination with the former part, the process, as hereinbefore described, for recovering the ammonia which would otherwise be wasted.

HARRISON GREY DYAR.
JOHN HEMMING.

Witnesses:
S. CARPMAIL,
W. H. RITCHIE.